United States Patent [19]

Guglielmo, Sr.

[11] Patent Number: 4,554,092

[45] Date of Patent: Nov. 19, 1985

[54] PRESERVATIVE SYSTEM COMPOSITION FOR NON-POROUS SURFACES AND WOODEN SURFACES

[75] Inventor: Richard J. Guglielmo, Sr., Cresskill, N.J.

[73] Assignee: EMA Company, Cresskill, N.J.

[21] Appl. No.: 508,519

[22] Filed: Jun. 27, 1983

Related U.S. Application Data

[63] Continuation-in-part of Ser. No. 888,373, Mar. 20, 1978, Pat. No. 4,393,102, and a continuation-in-part of Ser. No. 341,275, Jan. 21, 1982.

[51] Int. Cl.$^4$ ............................................. C09K 15/32
[52] U.S. Cl. ................................. 252/400 R; 106/15.05
[58] Field of Search ................. 106/15.05; 252/400.51

[56] References Cited

U.S. PATENT DOCUMENTS

| | | | |
|---|---|---|---|
| 2,593,267 | 4/1952 | Church et al. | 252/400.51 |
| 3,925,246 | 12/1975 | Coates et al. | 252/400.51 |
| 4,220,688 | 9/1980 | Mitchell et al. | 106/15.05 |
| 4,260,535 | 4/1981 | Russell | 106/15.05 |
| 4,303,726 | 12/1981 | Turner | 105/15.05 |
| 4,314,850 | 2/1982 | Watanabe et al. | 106/15.05 |
| 4,389,460 | 6/1983 | Dawans et al. | 106/15.05 |

*Primary Examiner*—Paul Lieberman
*Assistant Examiner*—Willie J. Thompson
*Attorney, Agent, or Firm*—Louis E. Marn

[57] ABSTRACT

There is disclosed a preservative system composition for porous and non-porous surfaces comprising from 2 to 10 percent, preferably 5–7 percent by weight of a tributyl tin ester selected from the group consisting of tri-n-butyl tin linoleate, bis(tri-n-butyl) tin succinate, tri-n-butyl tin benzoate, trinbutyl tin salicylate and mixtures thereof, in an organic solvent system or a water base system, preferably a water base system, for controlling algae, fungi, shipworms, gribbles, barnacles and other marine organisms and the like from attacking a metal or fiberglass substrate and wooden surfaces.

8 Claims, No Drawings

4,554,092

PRESERVATIVE SYSTEM COMPOSITION FOR NON-POROUS SURFACES AND WOODEN SURFACES

FIELD OF THE INVENTION

This application is a continuation-in-part of U.S. application Ser. Nos. 888,373 now U.S. Pat. No. 4,393,102 and 341,275, filed Mar. 20, 1978 and Jan. 21, 1982, respectively. This invention relates to a composition of matter and a process for using same, and more particularly to a preservative and/or anti-fouling coating for treating non-porous and porous surfaces and in particular, metal, fiberglass & wooden surfaces such as crab pots, boat hulls and the like.

BACKGROUND OF THE INVENTION

It has been found that metal, fiberglass and/or wooden surfaces exposed to sea and lake water, experience heavy levels of fouling and deterioration due to growth of algae, fungi, barnacles and other marine organisms. Accordingly, this limits the expected life and use of metal, fiberglass and wooden products exposed to such conditions. Therefore, preservative and coating compounds have been used for centuries with only partial success.

Antifouling chemicals, such as copper compounds, mercurial compounds and pentachloraphenol are presently in wide use. However, due to high human toxicity and also suspect carcinogenic properties, the use of these chemicals as antifouling or preservative chemicals has been limited or greatly curtailed.

Bistrinbutyl tin oxides (TBTO) have been used to replace the above chemicals because of their effectiveness against algae, fungi, shipworms, gribbles, barnacles and other marine organisms. TBTO has a relatively low toxicity factor as it pertain to humans. However, a major drawback to the use of TBTO is its volatility (vaporization) and its chemical instability, that is, TBTO breaks down to di and/or monobutyl tin compounds which diminishes its capacity as an antifouling or preservative agent.

OBJECTS OF THE INVENTION

An object of the present invention is to provide a preservative and/or anti-fouling system composition exhibiting substantial efficacy over extended periods of time after application.

Another object of the present invention is to provide a preservative and/or antifouling system composition readily applied to a metal, fiberglass substrate and wooden surfaces.

Still another object of the present invention is to provide a preservative and/or anti-fouling system composition which is relatively less toxic to man during its application.

Yet another object of the present invention is to provide a preservative system composition not readily removed from the metal or fiberglass substrate.

A further object of the present invention is to provide a preservative and/or anti-fouling system capable of providing a coating system whereby the leach out rate of the toxin or active ingredient is controlled so that there is enough active ingredient available on the surface of the coating to control the marine growth over extended periods of time.

SUMMARY OF THE INVENTION

These and other objects of the present invention are achieved by the use in a preservative system composition of from 2 to 10 percent, preferably 5-7 percent by weight of a tributyl tin ester selected from the group consisting of tri-n-butyl tin linoleate, bis(tri-n-butyl) tin succinate, tri-n-butyl benzoate, trinbutyl tin salicylate and mixtures thereof, in an organic solvent system or a water base system, preferably a water base system, for controlling algae, fungi, shipworms, gribbles, barnacles and other marine organisms and the like from attacking a metal or fiberglass substrate and wooden surfaces.

DETAILED DESCRIPTION OF THE INVENTION

It has been found that tri-n-butyl tin esters can be used to replace existing treatment chemicals, such as copper, mercurial compounds, pentachlorophenol and tributyl tin oxides. This is extremely important since certain of these esters are considerably less toxic to man, and are found to be extremely stable and heat resistant and have a low volatility. They also have low water solubility which keeps the deposited tin ester on the substrate, and there is enough water solubility to produce excellent effectiveness against the organisms being controlled.

The tri-n-butyl tin esters used in the present invention are selected from the group consisting of tri-n-butyl tin linoleate, bis(tri-n-butyl) tin succinate, tri-n-butyl tin benzoate, tri-n-butyl tin salicylate and mixtures thereof, with the tri-n-butyl tin lineolate being the preferable ester. The tri-n-butyl tin ester is readily incorporated into a paint and/or plastic type formulation (organic solvents), or can also be mixed with water. The amounts of tri-n-butyl tin ester added are in an amount of from 2 to about 10 percent by weight, preferably 5-7 percent by weight to either the organic solvent system or a water base system, preferably the water base system when an individual tri-n-butyl tin ester is used. When using a mixture of tri-n-butyl tin esters, the mixture can be added in an amount from 5 to 15 percent, preferably 6-8 percent by weight to either the organic solvents system or a water base system, preferably a water base.

A method of application of the preservative and/or anti-fouling system composition of the present invention is achieved by painting the metal, fiberglass substrate, or wooden surface such as a boat hull, crab pot or the like with the mixture of preservative system concentrate in a solvent system, or by dipping the metal or fiberglass substrate, such as crab pots, in a tank containing the preservative system concentrate in a solvent system. When the metal or fiberglass substrate is dipped in a tank containing the preservative system concentrate in a solvent system, it should be allowed to set in the tank from about 1 to about 5 minutes, with a preferable time limit being approximately 3 minutes.

Although the metal or fiberglass substrate and wooden surface treated with the preservative or anti-fouling coating in a solvent system can be utilized when it becomes dry to the touch it is preferable that the metal or fiberglass and wooden surface preservative concentrate be allowed to cure. The purpose of curing allows for the vaporization or evaporation of the solvent system and the depositing of the preservative system concentrate onto the metal or fiberglass substrate. The preservative coating system concentrate should be allowed to cure from about 24 to 96 hours, with a preferable curing time of 72 hours prior to use.

It has been found that metal or fiberglass substrate and wooden surfaces treated with the preservative coating system composition of the present invention results in the active ingredient, i.e. a tri-n-butyl tin ester, having a controlled leach out and effective in protecting the substrate from attack by algae, fungi, shipworms, gribbles, barnacles and other marine organisms. Such efficacy has been repeatedly demonstrated whether in the fresh waters of the Great Lakes Region or the salt water of the Florida Keys, the Gulf, Cape Hatteras, Nova Scotia and the like.

The water solubility of the tin ester and the ratio of the tin ester to fillers such as clay allows one to control the leach out of the active ingredient on the surface so that long term effectiveness in preventing marine growth is accomplished.

The esterification of the tributyl tin oxides helps neutralize the tributyl tin oxides so that it can be incorporated into water system as well as stabilizing it. In particular, the tri-n-butyl linoleate has a LD50 which is about 10 times less toxic than straight tributyl tin oxides without reducing the tributyl tin oxides effectiveness against the marine type organisms.

EXAMPLE OF THE INVENTION

The following examples are illustrative of the present invention:

EXAMPLE I

The preservative system composition for non-porous and wooden surfaces can be a water borne, vinyl/acrylic base for use on wood and fiberglass hulls. The active ingredient tri-n-butyl tin linoleate has proven to be effective antifoulant in tropical and temperate waters.

It does not exfoliate into the marine environment when applied as directed and the active ingredient is controlled for long term effectiveness. It is effectve against surface adhering organisms. It stops or reduces algae, barnacles, mussels and other marine growth.

TABLE I

| COMPONENT | PARTS |
| --- | --- |
| Water | 25.02 |
| Sodium tripoly phosphate | .25 |
| Anti-Foaming Agent | .45 |
| Non-Ionic Surface Active Agent | .57 |
| Dispersion aid | .20 |
| Pigment | 4.02 |
| Hydroxy Methyl Cellulose | .67 |
| China Clay | 15.45 |
| Dibutyl phthalate | 1.05 |
| Ethylene glycol | .43 |
| Carbitol | .37 |
| Propylene Glycol | 1.20 |
| Ethylene Glycol Mono Ethyl Ether | 1.15 |
| Acrylic Polymer | 42.57 |
| Tri-n-butyl tin linoleate | 6.60 |
| | 100.00 |

The surface to be treated, such as a hull of a boat, is smoothed by sanding and cleaned. The composition is then painted on with the use of a brush, roller or spray gun. After applying a first coat of composition, the surface should be allowed to dry up to 8 hours before applying a second coat. Following the application of the second coat the surface should be allowed to dry up to 72 hours for curing purposes.

The application of the preservative system composition should be above the freezing temperature of water and should not be applied during rainy or misty conditions.

EXAMPLE II

In preparation for treating a crab pot with the preservative system composition of the present invention a preservative composition system concentrate is formulated for an organic base solvent system:

TABLE II

| COMPONENT | PARTS |
| --- | --- |
| Xylene | 44.55 |
| Acrylic Resin B 66 | 11.00 |
| Tall Oil Resin | 3.60 |
| Pigment Anti Float Agent | .60 |
| Tributyl tin linoleate | 5.25 |
| China Clay | 30.00 |
| Pigment | 5.00 |
| | 100.00 |

Such preservative system concentrate is then admixed with mineral spirits in a ratio of 10 parts of mineral spirits to 90 parts of concentrate.

The crab pot to be treated is dipped in a tank containing the preservative system composition and is allowed to remain there for 3 minutes. The crab pot is then removed and allowed to cure for 72 hours prior to usage.

EXAMPLE III

To determine the efficacy of the preservative system composition for nonporous surfaces of the present invention the following materials were tested to determine the amount of fouling that would take place after treatment by immersion in water for an extended period of time. The materials were mounted to square PVC frames having an internal area of 900 cm$^2$ and then weighed. The weight of the frame was subtracted from the total weight to give the weight of material used. The results of the preliminary mounting and weighing is as follows:

| Material | Mesh Size (cm) | Wire (mm) |
| --- | --- | --- |
| Plastic Coated Wire (PCW 1313) | 1.3 × 1.3 | 1.6002 |
| Plastic Coated Wire (PCW 1325) | 1.3 × 2.5 | 1.6002 |
| Plastic Coated Wire (PCWBAC CE3-2-161C) | 1.3 × 2.5 | 1.6002 |
| (Coated with the formulation of Example I) | | |
| Plastic Coated Wire (PCWBAG CE3-2-144A) | 1.3 × 2.5 | 1.6002 |
| (Coated with the formulation of Example II) | | |
| Hardware Cloth (HWC) | 1.3 × 1.3 | 0.8890 |
| Galvanized Wire (GZW) | 2.5 × 1.3 | 1.6000 |
| Stainless Steel 304 (SS 304) | 1.3 × 1.3 | 1.6002 |
| Vexar | 1.9 × 1.9 | 2.6670 |

The frames were then suspended from a platform and immersed in a cooling lake for a period of 63 days then removed. The panels were then reweighed with the weight of the frame subtracted therefrom. The resulting calculations were made showing the percent of weight change due to fouling of the material.

| Material | Initial weight (grams) | final weight (grams) | % weight change (grams) | Susceptibility to Fouling (gms/cc) |
| --- | --- | --- | --- | --- |
| PCW 1313 | 300 | 935 | 312 | 0.83 |
| PCW1325 | 274 | 818 | 299 | 0.94 |
| PCWWBAC | 279 | 405 | 145 | 0.22 |

-continued

| Material | Initial weight (grams) | final weight (grams) | % weight change (grams) | Susceptibility to Fouling (gms/cc) |
| --- | --- | --- | --- | --- |
| CE3-2-161C PCWSBAG | 279 | 315 | 113 | 0.06 |
| CE3-2-144A HWC | 147 | 297 | 202 | 0.35 |
| GZW | 224 | 485 | 217 | 0.65 |
| SS304 | 229 | 601 | 262 | 0.48 |
| Vexar | 48 | 423 | 881 | 0.49 |

While the invention has been described in connection with the exemplary embodiments thereof, it will be understood that many modifications will be apparent to those of ordinary skill in the art and that this application is intended to cover any adaptions or variations thereof. Therefore, it is manifestly intended that this invention be only limited by the claims and the equivalents thereof.

What is claimed:

1. A preservative composition for non-porous and wooden surfaces comprised of a tri-n-butyl tin ester selected from the group consisting of tri-n-butyl tin linoleate, bis(tri-n-butyl) tin succinate, tri-n-butyl tin benzoate, tri-n-butyl tin salicylate and mixtures thereof in an amount of from 2 to 10 percent by weight in a solvent system.

2. The preservative composition for non-porous and wooden surfaces as defined in claim 1 wherein said solvent system is an organic base solvent.

3. The preservative composition for non-porous and wooden surfaces as defined in claim 1 wherein said solvent is a water base solvent.

4. The preservative composition for non-porous and wooden surfaces as defined in claim 1, wherein said tri-n-butyl tin ester is present in an amount of from about 5 to 7 percent by weight in said solvent system.

5. The preservative composition for non-porous and wooden surfaces as defined in claim 1, wherein said mixture of tri-n-butyl tin ester is present in an amount of from 6 to 8 percent by weight in said solvent system.

6. The preservative system composition for non-porous and wooden surfaces as defined in claim 4 wherein said tri-n-butyl tin ester is tri-n-butyl tin linoleate.

7. The preservative composition for non-porous and wooden surfaces as defined in claim 1 wherein a filler is added to said tri-n-butyl tin ester to control leach out of said tri-n-butyl tin ester.

8. A preservative composition for non-porous and wooden surfaces comprising at least two separate mixable parts respectively consisting essentially of
 (a) a tri-n-butyl tin ester selected from the group consisting of tri-n-butyl tin linoleate, bis(tri-n-butyl) tin succinate, tri-n-butyl tin benzoate, tri-n-butyl tin salicylate and mixtures thereof admixed with an aromatic hydrocarbon as one part, and
 (b) an organic solvent as the other part wherein said second part and said first part are mixed in an amount of from 9 parts of said second part to one part of said first part.

* * * * *